United States Patent

McGrath

[11] Patent Number: 6,034,679
[45] Date of Patent: Mar. 7, 2000

[54] METHOD AND APPARATUS FOR CONTROLLING EDITING OF RECORDED AUDIO AND/OR VIDEO MATERIAL

[75] Inventor: Mark John McGrath, Harmanswater, United Kingdom

[73] Assignees: Sony Corporation, Tokyo, Japan; Sony United Kingdom Limited, Weybridge, United Kingdom

[21] Appl. No.: 08/831,613

[22] Filed: Apr. 9, 1997

[30] Foreign Application Priority Data

Apr. 12, 1996 [GB] United Kingdom .................... 9607640

[51] Int. Cl.$^7$ .......................................... G06F 3/00
[52] U.S. Cl. ................................... 345/328; 345/348
[58] Field of Search .................... 345/348, 328, 345/349, 354, 302, 145; 386/52, 55

[56] References Cited

U.S. PATENT DOCUMENTS

| | | | |
|---|---|---|---|
| 5,191,645 | 3/1993 | Carlucci et al. | 345/328 |
| 5,202,961 | 4/1993 | Mills et al. | 345/328 |
| 5,237,648 | 8/1993 | Mills et al. | 345/433 |
| 5,388,197 | 2/1995 | Rayner | 345/328 |
| 5,404,316 | 4/1995 | Klingler et al. | 345/328 |
| 5,442,744 | 8/1995 | Piech et al. | 345/302 |
| 5,519,828 | 5/1996 | Rayner | 345/326 |
| 5,537,528 | 7/1996 | Takahashi et al. | 345/302 X |
| 5,675,752 | 10/1997 | Scott et al. | 345/302 X |
| 5,732,184 | 3/1998 | Chao et al. | 386/55 |
| 5,760,767 | 6/1998 | Shore et al. | 345/328 |

FOREIGN PATENT DOCUMENTS

| | | |
|---|---|---|
| 0 113 993 | 7/1984 | European Pat. Off. . |
| 0 564 247 A1 | 10/1993 | European Pat. Off. . |
| 0 737 978 | 10/1996 | European Pat. Off. . |
| 2 266 037 | 10/1993 | United Kingdom . |

OTHER PUBLICATIONS

Kazuaki Tanaka et al: "Intelligent Rough Video Editing System" Hitachi Review, vol. 44, No. 4, Aug. 1, 1995, pp. 217–220, XP000550273.

*Primary Examiner*—Crescelle N. dela Torre
*Attorney, Agent, or Firm*—Frommer Lawrence & Haug, LLP.; William S. Frommer

[57] ABSTRACT

An edit controller for controlling editing of recorded audio and/or video material, in which temporally successive material clips of a edited output material sequence are represented by corresponding clip icons on a display screen, comprises cursor controller for providing user control of a cursor on the display screen; selection controller for selecting an operation to be performed by the edit controller in dependence on the current position of the cursor on the display screen when the selection controller is activated by the user; logic for defining first and second display screen selection areas for each clip icon, the first and second display screen selection areas each having a predefined position on the display screen with respect to a current display position of the respective clip icon; logic, responsive to user operation of the selection controller while the cursor is displayed within the first selection area associated with a clip icon for initiating replay of the output material sequence from the start of the material clip corresponding to that clip icon; and logic, responsive to user operation of the selection controller while the cursor is displayed within the second selection area associated with a clip icon for initiating replay of the output material sequence from a point within the material clip corresponding to that clip icon which is a predetermined time before the end of that material clip.

9 Claims, 6 Drawing Sheets

METHOD AND APPARATUS FOR CONTROLLING EDITING OF RECORDED AUDIO AND/OR VIDEO MATERIAL

BACKGROUND TO THE INVENTION

1. Field of the Invention

This invention relates to the editing of recorded material (such as audio or video material) and to edit controllers such as audio and/or video edit controllers.

2. Description of the Prior Art

As an example, video edit controllers are used to edit a number of "raw" source video sequences into a final programme or part of a programme. For example, a short news story may contain brief excerpts of a number of different video sequences, possibly including newly captured and older, archived sequences, in order to illustrate different aspects of the news story. A relevant portion or "clip" of each sequence needs to be selected, and the selected portions linked together to form the composite output sequence.

Recently, computer-based non-linear edit controllers have become available. These allow a user to view the source sequences on a computer screen and to select an "in-point" and an "out-point" for each required sequence using the computer keyboard or a cursor control device such as a mouse, joystick or trackerball.

Figure 1:
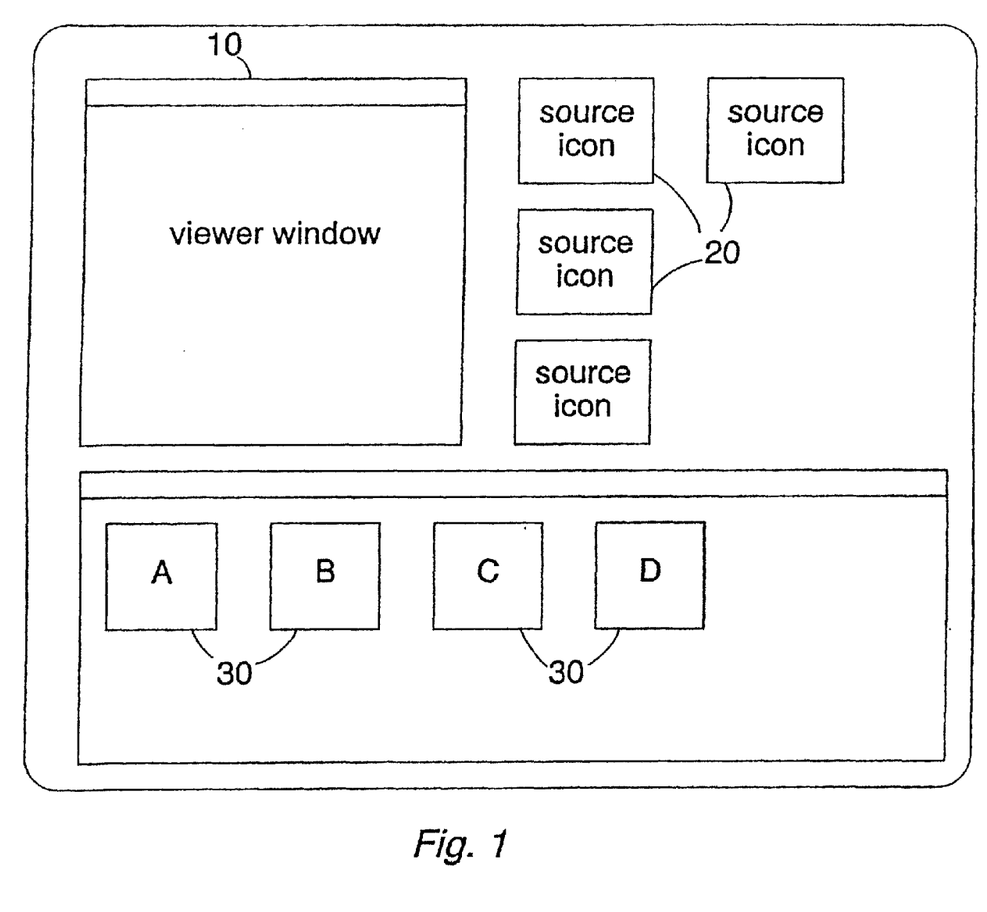
FIG. 1 is a schematic diagram of a display screen of an edit controller.

An example of a display screen for such an edit controller is shown schematically in FIG. 1 of the accompanying drawings.

In FIG. 1, a number of source video sequences are stored either on video tape or in a computer-based storage device such as a hard disk. The source sequences are registered with the edit controller, for example by the user indicating where on a video tape that source sequence can be found, or simply by the sequence being copied into the computer-based storage device. The source video sequences are then represented by source icons 20 in an upper area of the display screen. These source video sequences are then all available for editing by the user.

A viewer window 10 is provided for viewing a currently selected source (or output) video sequence. To view a source video sequence the user simply selects the corresponding source icon, for example by double-clicking (using a mouse cursor control device) on the icon. That source sequence can then be viewed in the viewer window, under the control of simulated video tape recorder controls such as play, stop, rewind etc.

When a portion of a source video sequence is selected by the user specifying an in-point and an out-point, that portion is represented in a lower, output area of the screen by a clip icon 30. In contrast to the source icons described above, where the order of display on the display screen simply related to the order in which the source sequences were registered or loaded, the order of the output icons 30 is important. In particular, the order (from left to right) of the icons on the screen represents the order in which the corresponding portions of video sequences will be replayed to for the output edited sequence.

Thus, in the example of FIG. 1, if the user double-clicks on the clip icon 30A, then the whole of the portion A will be displayed, followed immediately by the whole of the portion B, then C and finally D. The composite sequence ABCD forms the edited output programme.

If the user wishes to preview only, say, a latter part of the edited output programme, he could double-click on the clip icon 30C, in which case replay would start from the beginning of clip C, to be followed immediately by clip D.

SUMMARY OF THE INVENTION

This invention provides an edit controller for controlling editing of recorded audio and/or video material, in which temporally successive material clips of a edited output material sequence are represented by corresponding clip icons on a display screen, the controller comprising:

cursor control means for providing user control of a cursor on the display screen;

selection control means for selecting an operation to be performed by the edit controller in dependence on the current position of the cursor on the display screen when the selection control means is activated by the user;

means for defining first and second display screen selection areas for each clip icon, the first display screen selection area having a predefined position on the display screen with respect to a current display position of the respective clip icon and the second display screen selection area having a predefined position with respect to a current display position of the respective clip icon and/or the next clip icon in the temporal replay order;

means, responsive to user operation of the selection control means while the cursor is displayed within the first selection area associated with a clip icon for initiating replay of the output material sequence from the start of the material clip corresponding to that clip icon; and means, responsive to user operation of the selection control means while the cursor is displayed within the second selection area associated with a clip icon for initiating replay of the output material sequence from a point within the material clip corresponding to that clip icon which is a predetermined time before the end of that material clip.

The invention recognises that a previously proposed edit controller in which successive output material clips are represented by corresponding screen icons has limitations when the user wishes to review the edited output material sequence.

For example, while replay from the start of one of the output clips can be controlled as described above, if the user wishes to review just the join or edit point between two successive clips, then in the previously proposed system he would have had either to (a) initiate replay from the start of the preceding clip and wait until the end of that clip; or (b) use a jog or similar control to replay just the closing seconds of the preceding clip. Both of these techniques are inconvenient for the user, who may be under time pressure to work efficiently (e.g. in a news-gathering editing environment).

The invention addresses this technical problem of providing means for reviewing the edit transition between successive clips, by providing two distinct controls associated with each clip icon. If the selection control means (e.g. a mouse button, trackerball button or joystick button) is operated when the cursor is in a first area associated with a clip icon, the whole of the corresponding clip is replayed. However, if the cursor is in a second area associated with that icon, only the closing seconds (or other predetermined amount) of the clip is replayed. In both cases, replay can then continue to temporally succeeding clips.

Thus, by using the second area associated with an icon (which may be, for example, at the right hand edge of each icon, between that icon and the temporally following icon or at the left hand edge of the temporally following icon), the user can preview the edit transition from a point just before the end of that clip.

The system is particularly convenient to use if the icons are arranged in temporal order along a predetermined screen direction (e.g. from left to right).

Preferably the predetermined time may be set by the user.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

FIG. 1 is a schematic diagram of a display screen of an edit controller. The display screen will be described first to give an overview of the edit controller operation, and then the hardware and software underlying this will be described further. In fact, much of FIG. 1 has already been described above.

The replay operation described above (initiated by clicking on the viewer window) can be stopped by a single mouse click within the viewer window. The viewer window can also be used to control shuttle operation, in a manner to be described further below.

It is possible for the user to re-order the clip icons to rearrange the order in which the clips are to be displayed in the edited output video sequence. In the present example, this can be achieved using the "drag-and-drop" mechanism similar to that which is standard to the Microsoft Windows version 3.1 operating system. Using this mechanism, the user can position the display screen cursor over a clip icon to be moved, and then press and hold the mouse button. If the cursor is then moved while the mouse button is pressed and held, the icon is "dragged" with the cursor to a new position. The mouse button is released to "drop" the clip icon at the new position.

For example, the clip icon 30B could be dragged and dropped to a position between the clip icons 30C and 30D. Thus, the order of the clip icons on the display screen would become ACBD and the output edited sequence would comprise clip A followed by clip C, clip B and finally clip D.

The output edited sequence can be viewed by the user as follows. If the user double-clicks on the clip icon 30A, then the whole of the portion A will be displayed, followed immediately by the whole of the portion B, then C and finally D. The composite sequence ABCD forms the edited output programme.

If the user wishes to preview only, say, a latter part of the edited output programme, he could double-click on the clip icon 30C, in which case replay would start from the beginning of clip C, to be followed immediately by clip D.

Further techniques for previewing the output sequence will be described below.

Figures 2, 10:
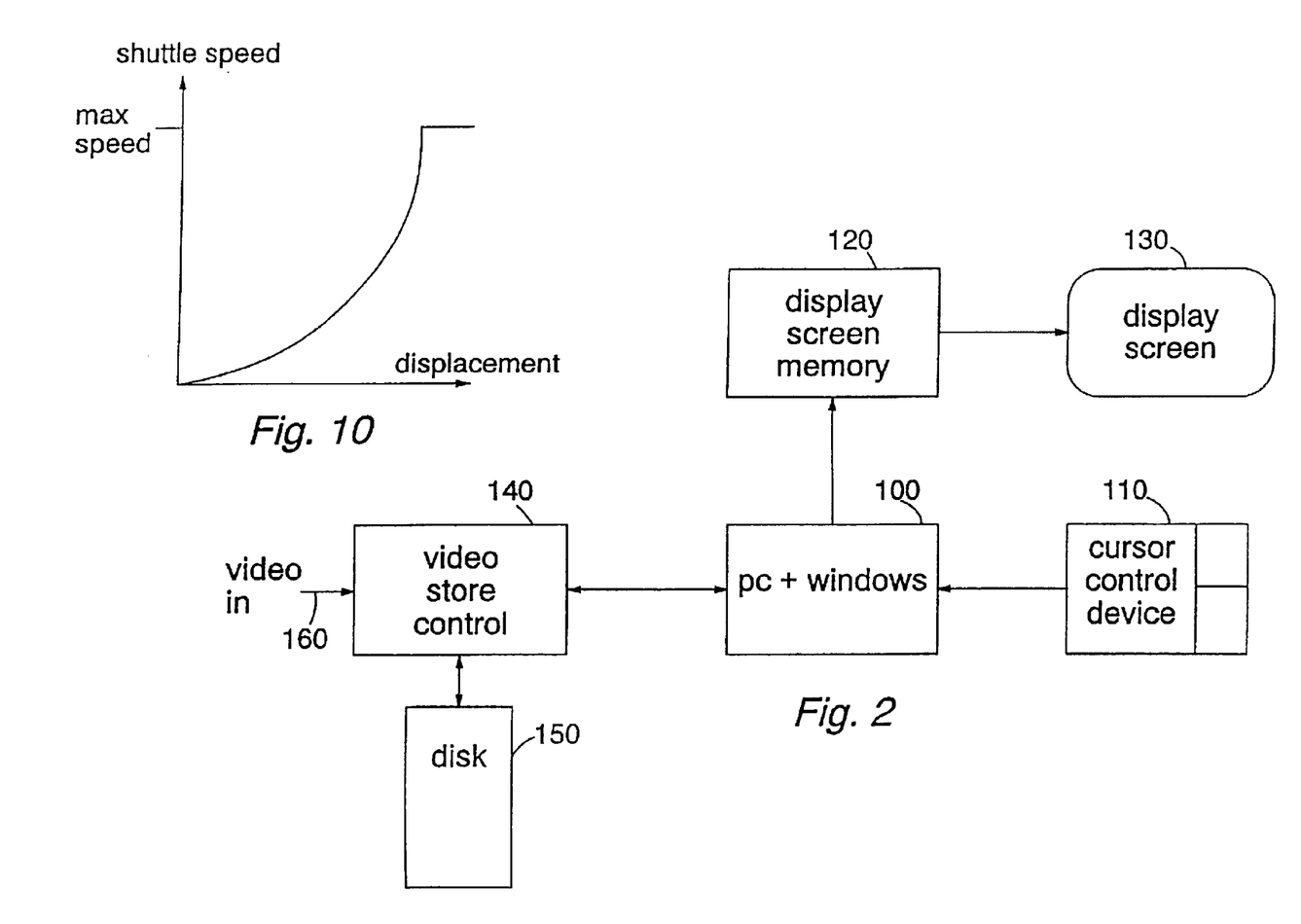
FIG. 2 is a schematic block diagram of an edit controller and associated video storage apparatus.
FIG. 10 is a schematic graph of shuttle speed against cursor displacement.

FIG. 2 is a schematic block diagram of the edit controller and associated video storage apparatus.

The edit controller comprises a personal computer (PC) 100 running the Microsoft Windows 3.1 operating system, the PC having a cursor control device 110 (e.g. a mouse), a display screen memory 120 and a display screen 130. The PC in the present embodiment is a notebook computer, the IBM "Thinkpad 760C", in which the PC 100, the cursor control device 110, video display screen memory 120 and the display screen 130 are all incorporated into a single portable unit. (In actual fact, the cursor control device 100 in the IBM Thinkpad is a joystick control device, but since this is set up to mimic the operation of a mouse, and an external mouse port is also available on this PC, the term "mouse" will be used for convenience as a generic term for a cursor control device in the following description.)

The PC 100 communicates with a video store controller 140 which in turn accesses video and audio data stored on a magneto-optical disc 150. In the present embodiment, the video store controller and the MO disc 150 are provided within a "docking station", i.e. a box of similar size to the IBM Thinkpad, on which the IBM Thinkpad may rest.

In operation, a video signal is supplied at an input port 160 of the video store controller and is subjected to a high degree of intra-picture data compression for storage on the MO disc 150. When one or more sections of source video have been stored on the MO disc 150, they can be manipulated by the user operating the edit controller to generate an edit decision list which is a list of time codes defining "in-points" and "out-points" of the source material for successive portions of an output edited video sequence. The edit decision list can then be applied to the original video data as supplied to the video store controller 140, for broadcast or distribution.

Figures 3A, 3B:
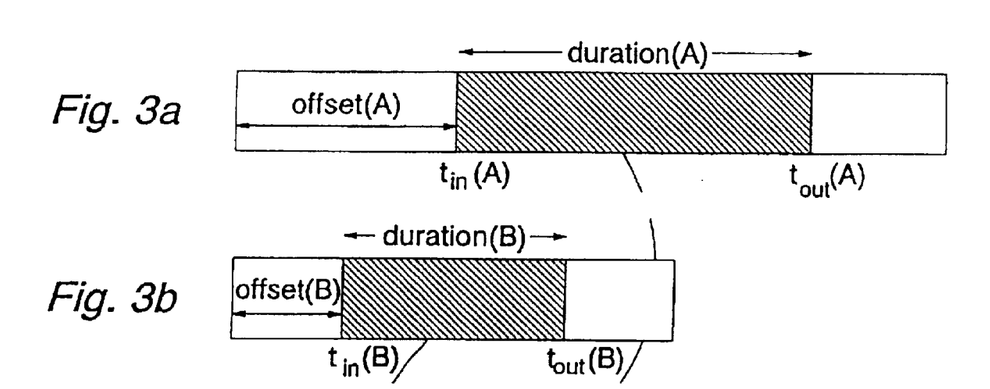
FIGS. 3a to 3c schematically illustrate source video files.
Figure 3C:
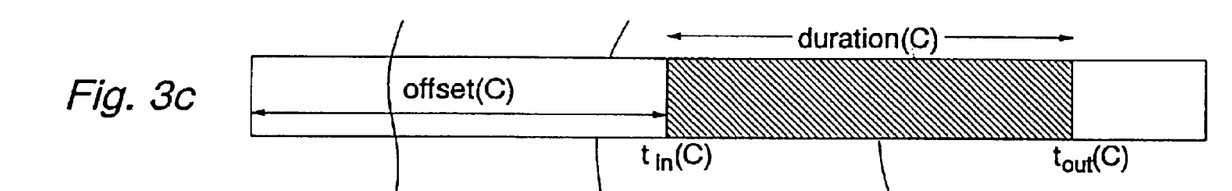
Figure 3D:
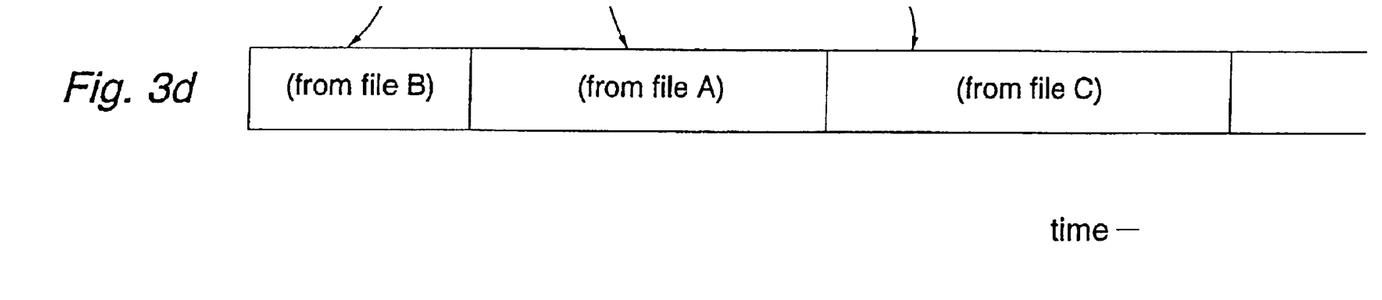
FIG. 3d schematically illustrates an edited output video sequence.

FIGS. 3A to 3C schematically illustrate source video files, and FIG. 3D schematically illustrates an edited output video sequence. In all of FIGS. 3A to 3D, time is represented on a horizontal axis from left to right.

The output video sequence of FIG. 3D is formed of successive portions or clips of the source files of FIGS. 3B, 3A and then 3C. These are joined together contiguously by "cut" edits.

In use, in order to generate one of the clips from a source file, the user would replay that source file in the viewer window until a suitable in-point, $t_{in}$ was located. The user would operate a particular key or click on a cursor control on the screen (not shown). The user would then continue the replay of the source file until a suitable out-point was found, and then operate the appropriate control to define that out-point.

An entry in the edit decision list (see below) would then be created, along with a corresponding clip icon (see below). The newly created EDL entry and clip icon would be placed as a new temporally last item in the sequence of clips already prepared. However, this temporal order can easily be altered, as described below.

Figure 4A:
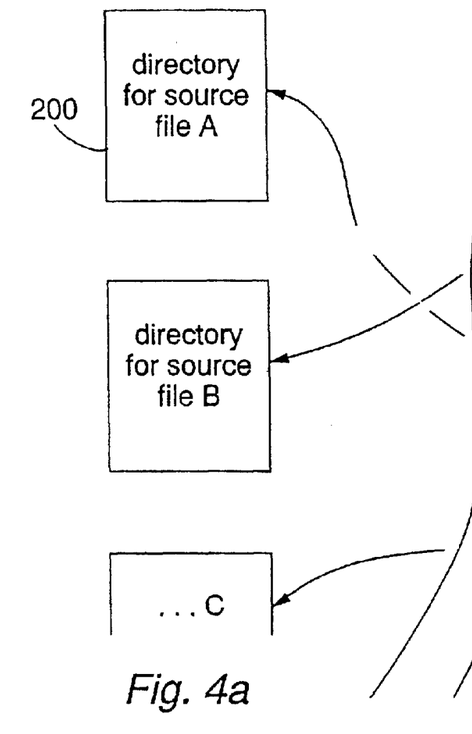
FIGS. 4a to 4c schematically illustrate the logical relationship between clip icons, an edit decision list and data representing source video files.
Figure 4B:
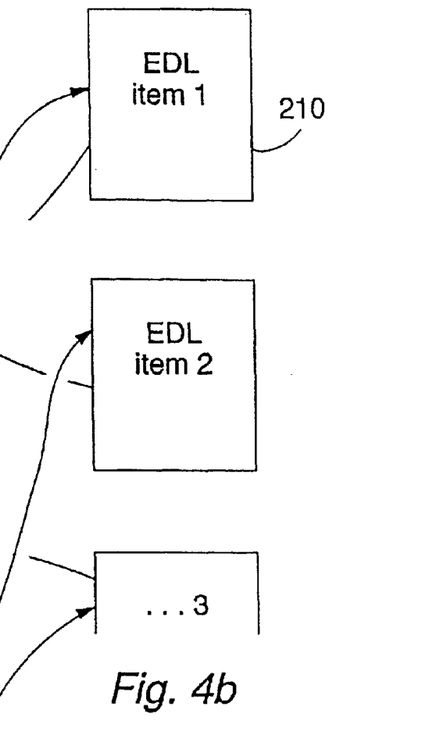
Figure 4C:
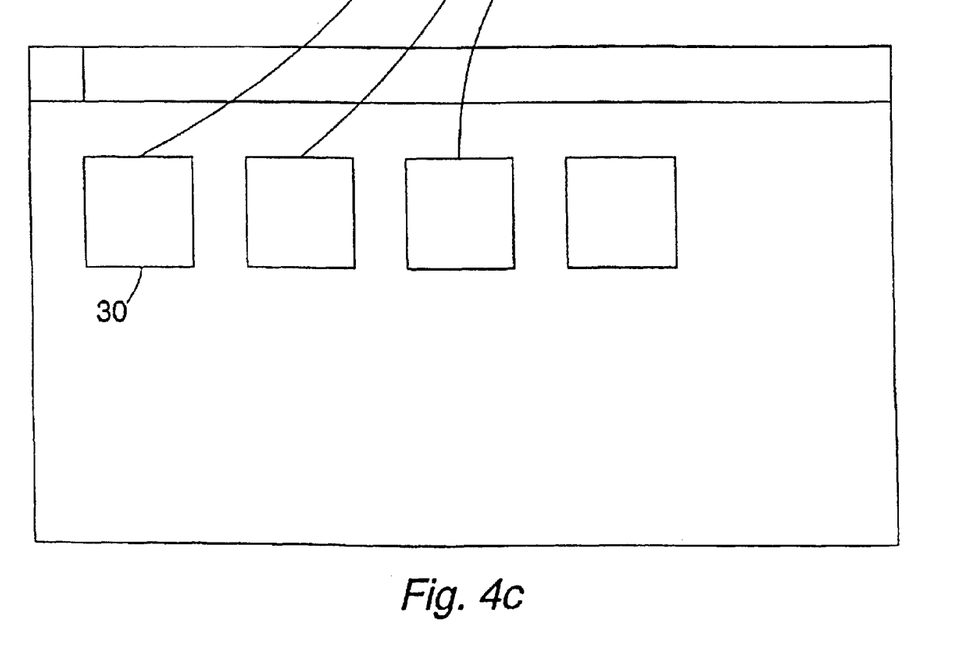

FIGS. 4A to 4C schematically illustrate the logical relationship between clip icons 30, an edit decision list (FIG. 4B) and data representing the source video files (FIG. 4A).

Each of the schematic boxes 200 in FIG. 4A represents a file header or directory entry for a file on the MO disc 150 corresponding to a section of source video. The directory entry includes file information such as a title, a starting time code and a finishing time code. Each such directory entry is associated with a single source icon 20 on the display screen of FIG. 1.

The boxes 210 of FIG. 4B schematically illustrate entries in an edit decision list. Each such entry relates to one contiguous portion of the output video sequence derived from a single one of the source video files. The entry contains information defining one of the source video files and a corresponding "Reel ID" defining the origin of the source file (e.g. a reel of video tape), an offset start variable defining the first picture of the sequence to be taken from that source video file, a duration variable defining the duration of the portion to be used from that source video file, and two compressed pictures: an in picture and an out picture. These compressed pictures are accessed from the data corresponding to their source file stored on the MO disc 150 when the EDL item is first created.

All of the times relating to in-points, out-points, offsets and durations are expressed in the standard video timecode format HH:MM:SS:FF (hours:minutes:seconds:frames)

The edit decision list for the example of FIGS. 3a to 3d therefore stores the following data:

| | | |
|---|---|---|
| EDL item 1 | File ID: B | |
| | Reel ID: reel 1 | |
| | offset (B) | |
| | duration (B) | |
| | picture at $t_{in(B)}$ | |
| | picture at $t_{out(B)}$ | |
| EDL item 2 | File ID: A | |
| | Reel ID: reel 2 | |
| | offset (A) | |
| | duration (A) | |
| | picture at $t_{in(A)}$ | |
| | picture at $t_{out(A)}$ | |
| EDL item 3 | File ID: C | |
| | Reel ID: reel 3 | |
| | offset (C) | |
| | duration (C) | |
| | picture at $t_{in(C)}$ | |
| | picture at $t_{out(C)}$ | |
| . . . | | | where duration(A) is equal to $(t_{out(A)}-t_{in(A)})$.

On replay of the output edited sequence, a linked list of storage locations on the disk is created by the PC and transmitted to the video store controller to define the frames necessary for the output edited sequence. This linked list is also stored on the disk so that it can be accessed later if required, even in a later editing session.

The same replay mechanism is used to replay a source file, in that a linked list of storage locations on the MO disk is derived by the PC 100 reference to the source file header and is transmitted to the video store controller, which then reads the frames at those storage locations in the appropriate order for replay. Shuttle replay is also possible by replaying the frames at a higher rate or by replaying only, say, 1 in n of the frames to achieve the desired shuttle speed.

To create the linked list of storage locations for an output edited sequence, first, the directory entry for file B is accessed and the starting timecode of file B is read from the directory entry. The offset variable, offset(B) is added to the starting timecode to calculate an in-point for this clip. The duration variable, duration(B) is added to the timecode of the in-point to calculate an out-point for the clip. The file address information stored in the directory entry (basically a linked list of data items or "clusters" on the MO disk 150) is accessed to determine which cluster holds the picture corresponding to the required in-point. The appropriate cluster for the in-point picture is specified as the first cluster for the current clip, and, following the existing linked list of clusters defined by the directory entry, successive storage locations are defined until the out-point for that clip is reached.

When the out-point for file B is reached, the process is repeated for the next clip (from file A in this example), and so on.

The linked list of storage addresses corresponding to the output edited sequence is referred to as a "virtual" file, and it can be replayed without further reference to the directory entries to the source files. Replay can be started at a point within the virtual file by simply cueing to the appropriate number of frames along the linked list of storage locations.

Referring to FIGS. 4a to 4c, therefore, each of the directory entries 200 corresponds to and defines the position on the MO disk 150 of a source video file. Each of the EDL items 210 corresponds to and defines an output clip, with reference to the directory entry 200 for the source file containing that clip.

In addition, each EDL item 210 corresponds to a respective clip icon 30 (as shown in FIG. 4c). The display order of the clip icons 30 from left to right (and into second and subsequent rows from left to right if required) in turn defines the order of the EDL items in the linked list of EDL items. The way in which this is achieved will be described below.

As mentioned above, the clip icons can be re-ordered by a drag-and-drop mechanism. To do this, the user moves the cursor onto one of the clip icons and presses and holds the mouse button. Then, as long as the mouse button remains held down, that clip icon (or at least a representative schematic outline of it) is "dragged" with the cursor. Wherever the dragged icon is on the screen when the mouse button is released then defines a new position of that clip icon.

In fact, in common with many existing uses of the drag-and-drop type of mechanism, the dragged icon in this system is not allowed to drop into any position in the output area of the screen. Instead, it is constrained to fall to a position on a defined grid of possible positions so that the resulting pattern of icons is equally spaced and without any missing icons, in horizontal rows from top left to bottom right. (This feature may be seen when program icons are moved within a program group under program manager in Microsoft Windows 3.1, with the "auto arrange icons" option enabled).

At the end of a drag-and drop operation, if the order of the clip icons has been changed, then the assignments between the child windows and the EDL items are correspondingly altered.

The above features are achieved by the way in which a computer programme is written to run under the Microsoft Windows 3.1 operating system. Many of the basic techniques necessary for an understanding of this are described in the book, "Programming Windows 3.1", Charles Petzold, Microsoft Press, third edition, 1992, which is incorporated herein by reference.

The EDL items and directory entries are maintained as normal variable structures in a conventional way. The directory entries in fact form a linked list, but this is not important to the present techniques.

The output area is a window, and the clip icons are so-called "child windows" operating under the parent window of the output area. Thus, although the clip icons appear to be just small icon-like graphical images, they do have some additional functionality as child windows themselves. So, in this description, the word "icon" is used in a broad sense to mean a graphical representation of a windows program and/or a piece of audio or video material, in so far as selecting, clicking on or moving the icon on the screen has an effect on the corresponding program or piece of audio or video material.

One such child window (clip icon) exists for each entry in the EDL. When the child window is painted or repainted by the Windows operating system, it displays either the in-picture or the out-picture from that EDL item. The choice of which of the two pictures is displayed is left to the user, through cursor buttons on the child window (not shown).

When the user clicks or double-clicks on a child window, Windows sends a message to that child window. In the case of a replay operation, a double click on a child window causes the child window program to communicate the location of the click or double click to the parent window, which in turn initiates replay of the video material corresponding to the selected child window.

Figure 5:
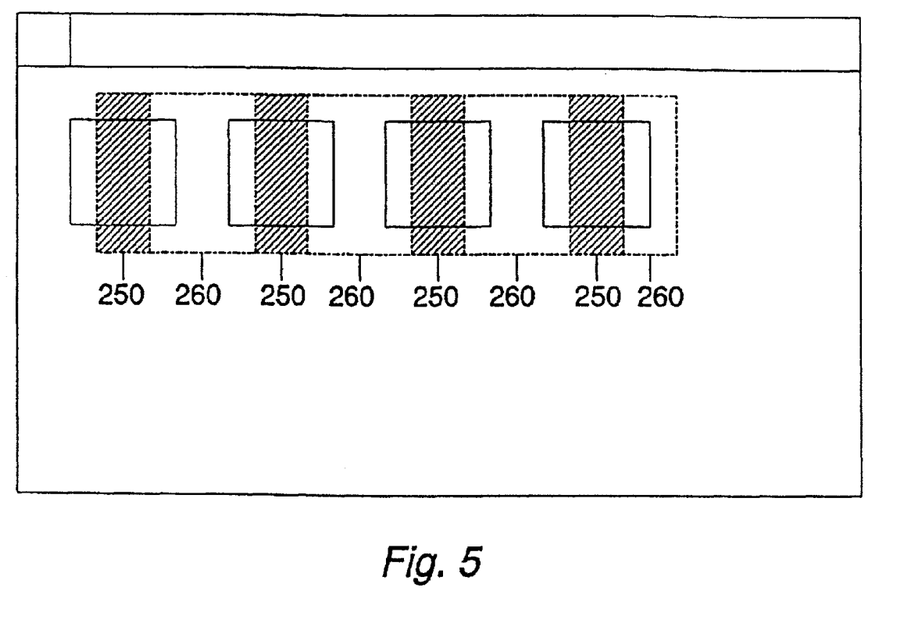
FIG. 5 schematically illustrates cursor mapping within an output area of the display screen of FIG. 1.

FIG. 5 schematically illustrates cursor mapping within an output area of the display screen of FIG. 1. The output area surrounding the clip icons is notionally divided into first regions 250 overlying a central area of each clip icon, and second regions 260 overlying the end area of a first clip icon and the beginning area of a second temporal clip icon.

When a double click of the mouse button is detected, the coordinates of the mouse cursor at that time (which are passed to the parent window either directly or via the child window, depending on whether the mouse cursor is within a child window at the time) are compared with coordinate ranges defining the first and second regions 250, 260.

If the cursor coordinates are within one of the first regions 250, then the video replay is initiated by the parent window from the start of the clip corresponding to the clip icon under that first region 250.

If the cursor coordinates are within a second region 260, then the parent window initiates video replay from the clip immediately to the left of the selected region 260, but from a predetermined time before the end of the clip. For example, the predetermined time might be 3 seconds before the end of that clip, but preferably this period can be set by the user. This allows the edit transition between that clip and the next to be reviewed by the user.

The time at which to start (or cue up) replay is calculated as follows:

| | |
|---|---|
| replay start timecode = | starting TC for output (virtual) file + lengths of preceding clips (if any) + duration of current clip − predetermined time period |

However, if the duration of the clip is less than the predetermined time period, replay is initiated from the start of the clip.

Figure 6:
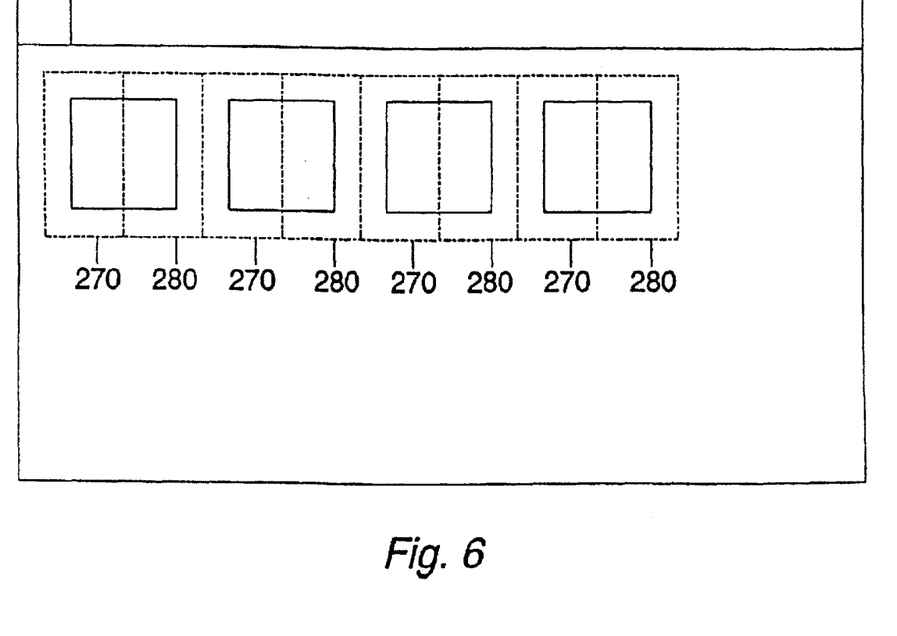
FIG. 6 schematically illustrates a second type of cursor mapping within the output area of the display screen of FIG. 1.

FIG. 6 schematically illustrates a second type of cursor mapping within the output area of the display screen of FIG. 1. Here, further regions are notionally defined by ranges of cursor coordinates, for use during a drag-and-drop operation.

During such an operation, the cursor coordinates (in the parent window) are continuously (repeatedly) checked against coordinate ranges defining "left" regions 270 and "right" regions 280 about each clip icon. In the example shown, one left region and one right region overlie each clip icon, and so during the drag and drop operation if the cursor is detected to be in either of those two regions, it is thereby detected that that is the nearest icon to the current cursor position.

The left and right regions can then be used to detect and indicate which side of the detected nearest icon the dragged icon would fall, if released then. Basically, if the cursor is in a left region, the dragged icon would fall to the left of the detected nearest icon. If the cursor is in a right region, the dragged icon would fall to the right of the detected nearest icon.

This detection can then be used to display an indication of which side of the detected nearest icon the dragged icon will fall.

Figure 7A:
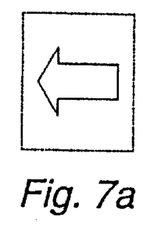
FIGS. 7a to 7c schematically illustrate different cursor types during a drag and drop operation.
Figure 7B:
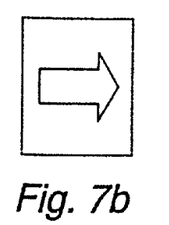
Figure 7C:
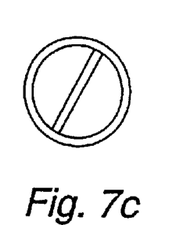

FIGS. 7a to 7c schematically illustrate different cursor types during a drag and drop operation.

When the cursor is in a left region 270, the cursor is changed (using a standard Windows cursor change routine) to the cursor of FIG. 7a. Similarly, when the cursor is in a right region, the cursor is changed to the cursor of FIG. 7b. The cursor of FIG. 7c indicates that the cursor is in neither a left nor a right region (and indeed it may be outside the parent window), and so it is not a valid place to drop the dragged icon. If the icon is dropped there, then it is either dropped at the end of the existing icon order (if still within the parent window) or the order of the icons in the parent window will not change (if outside the parent window).

Figure 8A:
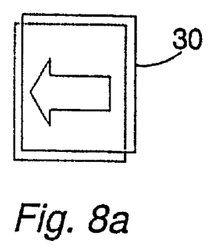
FIGS. 8a and 8b schematically illustrate the use of the different cursor types.
Figure 8B:
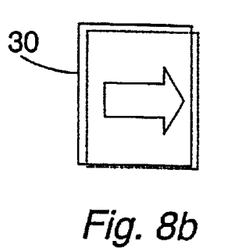

FIGS. 8a and 8b schematically illustrate the use of the different cursor types.

In FIG. 8a, the cursor is slightly to the left of an underlying clip icon 30, and so the left arrow cursor is displayed to give a clear indication to the user that the dragged icon will fall to the left of the underlying icon. Similarly, the situation is reversed in FIG. 8b. Thus a clear indication is given to the user of which side the dragged icon will fall.

In an alternative embodiment, the arrow-like indication could be placed over the detected nearest icon, rather than using a modification of the cursor itself.

Figure 9:
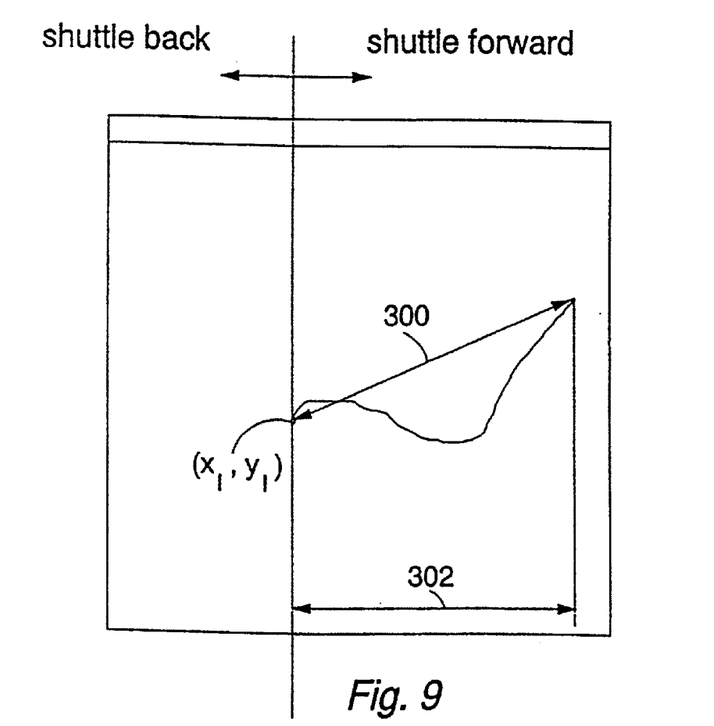
FIG. 9 schematically illustrates a shuttle control operation in a viewer window of the display screen of FIG. 1.

FIG. 9 schematically illustrates a shuttle control operation in a viewer window of the display screen of FIG. 1, and FIG. 10 is a schematic graph of shuttle speed against cursor displacement.

When the cursor is placed within the viewer window and the mouse button clicked and held, the viewer window initiates shuttle replay of the video material currently associated with the viewer window (depending on the last icon selected by the user, this could be an output clip or a source file).

In fact, this is defined as a two-stage process. When the mouse button is first pressed within the viewer window, (whether or not it is subsequently held down), the Windows "mouse down" message causes the Viewer window to issue a "stop" command to stop replay. Then, if the mouse button has not been released within a predetermined time (e.g. 0.5 seconds), as detected by recording the Windows timer at the time of the first mouse down message, shuttle operation is selected. Alternatively, if a double click is detected (i.e. a release and then a second click within a predetermined time) normal speed replay is initiated by the viewer window.

The viewer window temporarily "captures" the mouse as long as the button is held down—a standard Windows technique. The coordinates in the viewer window of the point at which the mouse button is first clicked ($x_I$, $y_I$) are stored, and the coordinates of the cursor at intervals thereafter ($x_C$, $y_C$) are compared with ($x_I$, $y_I$).

The shuttle speed is set to be dependent on the current value of:

$$|X_C - X_I|$$

i.e. on the horizontal component 302 of the distance 300 from the initial activation point to the current cursor position. However, this value does not in itself specify the shuttle speed; instead, there is a generally exponential relationship between the horizontal displacement component and the shuttle speed up to a maximum shuttle speed, as illustrated schematically in FIG. 10. This relationship is achieved by the value $|X_C - X_I|$ actually providing an index into a look-up table (e.g. in read-only-memory) defining shuttle speed values in response to different horizontal displacement component values.

The look-up table values can be selected or scaled so that a distance equal to, say, the width of the viewer window causes shuttle operation at the maximum available shuttle speed for the replay device being controlled.

As a further check, if $X_C > X_I$ then the cursor is now to the right of its initial position, and so forward shuttle operation is selected. Otherwise, reverse shuttle operation is selected. Thus, the sign of $|X_C - X_I|$ dictates the direction of shuttle operation.

When the mouse button is released, shuttle operation is maintained at the currently selected shuttle speed and direction. Shuttle operation can then be stopped by a single mouse click within the viewer window, which causes the "stop" command to be issued as mentioned above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An edit controller for controlling editing of recorded audio and/or video material, in which temporally successive material clips of an edited output material sequence are represented by corresponding clip icons on a display screen, said controller comprising:

cursor control means for providing user control of a cursor on said display screen;

selection control means for selecting an operation to be performed by said edit controller in dependence on the current position of said cursor on said display screen when said selection control means is activated by the user;

logic for defining first and second display screen selection areas for each clip icon, said first display screen selection area having a predefined position on said display screen with respect to a current display position of the respective clip icon and said second display screen selection area having a predefined position with respect to a current display position of said respective clip icon and/or a next clip icon in the temporal replay order;

logic for responding to user operation of said selection control means when said cursor is displayed within said first selection area associated with a clip icon for initiating replay of said output material sequence from the start of the material clip corresponding to that clip icon; and logic for responding to user operation of said selection control means when said cursor is displayed within said second selection area associated with a clip icon for initiating replay of said output material sequence from a point within said material clip immediately before said second selection area which is a predetermined time before the end of that material clip.

2. An edit controller according to claim 1, in which said clip icons are displayed in temporal order along a predetermined screen direction.

3. An edit controller according to claim 2, in which said predetermined screen direction is a horizontal screen direction.

4. An edit controller according to claim 1, in which said first selection area overlies the centre of the corresponding clip icon.

5. An edit controller according to claim 1, in which said second selection area is at least partially disposed between the corresponding clip icon and the temporally following clip icon.

6. An edit controller according to claim 5, in which said second selection area overlies an edge region of said corresponding clip icon and/or an edge region of said temporally following clip icon.

7. An edit controller according to claim 1, comprising means for displaying a respective different cursor when said cursor is positioned within said first and said second screen selection areas.

8. An edit controller according to claim 1, in which:

said cursor control means comprises a mouse, trackerball or joystick; and said selection control means comprises a mouse button, a trackerball button or a joystick button respectively.

9. A method of operation of an edit controller, in which temporally successive audio and/or video material clips of a edited output material sequence are represented by corresponding clip icons on a display screen, said controller comprising a cursor controller for providing user control of a cursor on said display screen; and a selection controller for selecting an operation to be performed by said edit controller in dependence on the current position of said cursor on said display screen when said selection controller is activated by the user; said method comprising:

defining first and second display screen selection areas for each clip icon, said first display screen selection area having a predefined position on said display screen with respect to a current display position of the respective clip icon and said second display screen selection area having a predefined position with respect to a current display position of said respective clip icon and/or the next clip icon in the temporal replay order;

initiating replay of the output material sequence, in response to user operation of said selection controller when said cursor is displayed within said first selection area associated with a clip icon, from the start of the material clip corresponding to that clip icon; and initiating replay of the output material sequence, in response to user operation of said selection controller when said cursor is displayed within said second selection area associated with a clip icon, from a point within the material clip immediately before said second selection area which is a predetermined time before the end of that material clip.

* * * * *